US006878440B1

(12) United States Patent
Yamanaka et al.

(10) Patent No.: US 6,878,440 B1
(45) Date of Patent: Apr. 12, 2005

(54) PRESSURE SENSITIVE ADHESIVE SHEET AND PRODUCTION METHOD THEREOF

(75) Inventors: Keizo Yamanaka, Sagamihara (JP); Tatsuo Fukushi, Woodbury, MN (US); Yorinobu Takamatsu, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 122 days.

(21) Appl. No.: 10/009,308

(22) PCT Filed: Jun. 23, 2000

(86) PCT No.: PCT/US00/17457

§ 371 (c)(1),
(2), (4) Date: Nov. 13, 2001

(87) PCT Pub. No.: WO01/02508

PCT Pub. Date: Jan. 11, 2001

(30) Foreign Application Priority Data

Jul. 2, 1999   (JP) .......................................... 11/189081

(51) Int. Cl.⁷ ................................................ C09J 7/02
(52) U.S. Cl. ...................... 428/345; 428/343; 428/354; 428/353; 428/421; 428/422; 427/208.4
(58) Field of Search ................................. 428/345, 343, 428/354, 353, 421, 422; 427/208.4

(56) References Cited

U.S. PATENT DOCUMENTS

| | | | |
|---|---|---|---|
| 2,642,416 A | 6/1953 | Ahlbrecht et al. | |
| 2,956,904 A | 10/1960 | Hendricks | |
| RE24,906 E | 12/1960 | Ulrich | |
| 3,133,854 A | 5/1964 | Simms | |
| 3,252,880 A | 5/1966 | Magat et al. | |
| 3,318,852 A | 5/1967 | Dixon | |
| 3,536,749 A | 10/1970 | Groves | |
| 3,574,791 A | 4/1971 | Sherman et al. | |
| 3,810,874 A | 5/1974 | Mitsch et al. | |
| 3,944,527 A | 3/1976 | McCown | |
| 4,129,617 A | 12/1978 | Machi et al. | |
| 4,171,397 A | 10/1979 | Morrow | |
| 4,181,752 A | 1/1980 | Martens et al. | |
| 4,230,768 A | 10/1980 | Hamada et al. | |
| 4,321,404 A | 3/1982 | Williams et al. | |
| 4,329,384 A | 5/1982 | Vesley et al. | |
| 4,358,559 A | 11/1982 | Holcomb et al. | |
| 4,404,247 A | 9/1983 | Dominguez-Burguette et al. | |
| 4,472,480 A | 9/1984 | Olson | |
| 4,508,916 A | 4/1985 | Newell et al. | |
| 4,533,566 A | 8/1985 | Evans et al. | |
| 4,543,268 A | 9/1985 | Sidney et al. | |
| 4,559,382 A | 12/1985 | Martens et al. | |
| 4,563,388 A | 1/1986 | Bonk et al. | |
| 4,567,073 A | 1/1986 | Larson et al. | |
| 4,594,262 A | 6/1986 | Kreil et al. | |
| 4,614,667 A | 9/1986 | Larson et al. | |
| 4,731,273 A | 3/1988 | Bonk et al. | |
| 4,740,562 A | 4/1988 | Menke et al. | |
| 4,743,300 A | 5/1988 | Brinduse et al. | |
| 4,820,588 A | 4/1989 | Brinduse et al. | |
| 4,830,910 A | 5/1989 | Larson | |
| 4,861,408 A | 8/1989 | Kelber | |
| 4,873,140 A | 10/1989 | McIntyre | |
| 4,933,060 A | 6/1990 | Prohaska et al. | |
| 4,981,727 A | 1/1991 | Brinduse et al. | |
| 4,985,473 A | 1/1991 | Williams et al. | |
| 5,037,668 A | 8/1991 | Nagy | |
| 5,047,287 A * | 9/1991 | Horiuchi et al. | ............ 428/242 |
| 5,112,882 A | 5/1992 | Babu et al. | |
| 5,209,971 A | 5/1993 | Babu et al. | |
| 5,209,972 A | 5/1993 | Super et al. | |
| 5,209,984 A | 5/1993 | Rolando et al. | |
| 5,266,400 A | 11/1993 | Yarusso et al. | |
| 5,276,079 A | 1/1994 | Duan et al. | |
| 5,283,101 A | 2/1994 | Li | |
| 5,288,400 A * | 2/1994 | Phillips | ...................... 210/151 |
| 5,306,758 A | 4/1994 | Pellerite | |
| 5,389,376 A | 2/1995 | Duan et al. | |
| 5,482,991 A | 1/1996 | Kumar et al. | |
| 5,492,599 A | 2/1996 | Olson et al. | |
| 5,512,225 A | 4/1996 | Fukushi | |
| 5,618,899 A | 4/1997 | Appelt et al. | |
| 5,668,210 A | 9/1997 | Harris et al. | |
| 5,686,544 A | 11/1997 | Pocius | |
| 5,738,746 A | 4/1998 | Billingsley et al. | |

FOREIGN PATENT DOCUMENTS

| | | |
|---|---|---|
| EP | 0 523 644 B1 | 11/1997 |
| GB | 868463 | 5/1961 |

(Continued)

OTHER PUBLICATIONS

J. of Applied Polymer Science; vol. V1(22), pp. 456–460, "The Predominant Reaction of Some Fluorinated Polymers to Ionizing Radiation"; Timmerman et al., 1962.*

Paciorek et al., "Mechanism of Amine Crosslinking of Fluoroelastomers. I. Solution Studies," *J. Polym. Sci.*, 45, 405–413 (1960).

Schonhorn et al., "Adhesive Bonding of Polyvinylidene Fluoride: Effect of Curing Agent in $PVF_2$ Surface Modification," *J. Adhesion Sci. Technol.*, 4, 277–290 (1989).

Makuuchi et al; "Effect of Evolved Hydrogen Fluoride on Radiation–Induced Crosslinking and Dehydrofluorination of Poly(Vinylidene Fluoride)," *J. Poly. Sci., Poly. Chem. Ed.*, 14, 617–625 (1976).

*Primary Examiner*—Daniel Zirker
(74) *Attorney, Agent, or Firm*—Brian E. Szymanski

(57) ABSTRACT

A fluorine-containing material substrate having coated thereon a pressure sensitive adhesive is irradiated with an electron beam, forming a chemical bond between substrate and the pressure sensitive adhesive. Furthermore the pressure sensitive adhesive can be cured by polymerization and also the substrate can be crosslinked.

18 Claims, 2 Drawing Sheets

FOREIGN PATENT DOCUMENTS

| | | |
|---|---|---|
| JP | 49-29613 | 8/1974 |
| JP | 61-7337 | 1/1986 |
| JP | 6131411 | 2/1986 |
| JP | 63-150330 | 6/1988 |
| JP | 10-58617 | 3/1989 |
| JP | 08-073819 | 3/1989 |
| JP | 2-28239 | 1/1990 |
| JP | 2209928 | 8/1990 |
| JP | 3-163182 | 7/1991 |
| JP | 3-250034 | 11/1991 |
| JP | 03250034 A | 11/1991 |
| JP | 4146129 | 5/1992 |
| JP | 4-232738 | 8/1992 |
| JP | 5-8353 | 1/1993 |
| JP | 8-245850 | 9/1996 |
| JP | 9-156036 A | 6/1997 |
| WO | WO 95/26281 A2 | 10/1995 |
| WO | WO 95/33013 | 12/1995 |
| WO | WO 96/31571 | 10/1996 |
| WO | WO 97/00297 | 1/1997 |
| WO | WO 98/08879 | 3/1998 |

OTHER PUBLICATIONS

L. Sidney et al., "Electron Beam and Gamma Fluoroelastomers," Proceedings of Rad Tech Asia '91, Osaka, Japan (Apr. 15–18, 1991).

Book: Scheirs, "Modern Fluoropolymers High Performance Polymers for Diverse Applications," *Wiley Series in Polymer Science*. John Wiley & Sons publishers (1998).

Article: El–Asay et al., "Radiation Initiated Grafting Onto Fluoro Polymers for Membrane Preparation," *Radiat. Phys. Chem.*, vol. 30, No. 4, (1987), pp. 237–242.

Article: Dworjanyn et al., "The Role of Multifunctional Acrylates in Radiation Grafting and Curing Reactions," *Radiat. Phys. Chem.*, vol. 33, No. 5, (1989), pp. 429–436.

Article: Kabanov et al., "Present Status and Development Trends of Radiation–Induced Graft Polymerization," *Radiat. Phys. Chem.*, vol. 37, No. 2, (1991), pp. 175–192.

* cited by examiner

PRESSURE SENSITIVE ADHESIVE SHEET AND PRODUCTION METHOD THEREOF

CROSS REFERENCE TO RELATED APPLICATIONS

This application claims priority to International Application No. PCT/US00/17457, filed Jun. 23, 2000, which was published under PCT Article 21(2) in English, and which claims priority to Japanese Application No. 11-189081, filed Jul. 2, 1999.

TECHNICAL FIELD

The present invention relates to a pressure sensitive adhesive sheet and a production method thereof, more specifically, the present invention relates to an adhesive sheet with an adhesive, comprising a fluorine-containing material sheet having formed thereon a pressure sensitive adhesive (adhesive) layer of, for example, acryl type, silicone type or fluorine type.

BACKGROUND ART

Fluorine-containing materials such as Dyneon™ THV (terpolymer of tetrafluoroethylene, hexafluoropropylene and vinylidene fluoride, produced by Dyneon) and PVDF (polyvinylidene fluoride) have excellent properties which hydrocarbon-based material cannot possess, and hold a very important position in industry. For example, the fluorine-containing material is suitable for the surface protective material of, for example, a billboard, a reflector or a solar cell, particularly for the outdoor use, because of such properties that the material is chemically stable and has excellent weatherability and high thermal stability.

The fluorine-containing material may be used solely as a part by inserting it or fixing it with screws or the like, however, this material is expensive and, therefore, mostly used as a composite material improved in the function by combining it with other materials (lamination or covering). As such applications of the composite material, for example, a film substituting for the finish coating, a protective film of billboard and so on are expected.

Problems to be Solved by the Invention

However, the fluorine-containing material inherently has a low surface energy, therefore, suffers from extremely poor adhesion to a dissimilar material, for example, a pressure sensitive adhesive or an adhesive. To overcome this problem, various methods for improving the adhesive property have been heretofore investigated.

Those methods are roughly classified into 1) a method of modifying the fluorine-containing material deficient in the adhesive property to enable its adhesion to an existing hydrocarbon material (adhesive), 2) a method of modifying a pressure sensitive adhesive or an adhesive to enable its adhesion to a material deficient in the adhesive property, and 3) a method of interposing a certain special adhesive layer between such dissimilar layers. To speak more specifically, in the case of 1), the carbon fluoride material is surface treated and the surface treatment includes a dry treatment such as flame treatment or corona treatment (see, U.S. Pat. No. 3,133,854, Example 10), and a wet treatment such as a combination of alkali solution, liquid ammonia and sodium, and a combination of metal sodium-naphthalene/tetrahydrofuran complex solution (see, U.S. Pat. Nos. 3,133,854 and 4,740,562 and Japanese unexamined Patent (Kokai) No. 61-7337). Also, a method for improving the adhesive property with a dissimilar material by modifying the fluoropolymer as a whole (for example, polymer blend or dehydrofluorination (see, U.S. Pat. No. 4,230,768)) has been proposed. In the case of 2), Japanese Unexamined Patent Publication (Kokai) No. 3-163182 of Yagi et al discloses effectiveness of an IPN-style adhesive of an acryl polymer and a fluoropolymer obtained by dissolving a fluorine-containing monomer in an acryl monomer and curing the blend, Japanese Unexamined Patent Publication (Kokai) No. 6131411 of Usami et al discloses effectiveness of an adhesive obtained by mixing an acryl monomer or oligomer and a fluoropolymer which are relatively high in the compatibility with each other, and U.S. Pat. No. 5,482,991 of Kumar et al discloses effectiveness of an acrylic pressure sensitive adhesive having acrylsiloxane fluoride. With respect to the theoretical research, Paciorek et al., *J. Polym. Sci.*, 45, 405–413 (1960) report that a fluoropolymer, PVDF in that paper, reacts with amine after the dehydrofluorination. Schonhorn et al., *J. Adhesion Sci. Technol.* 4, 277 (1989) report that PVDF reacts with an epoxy resin containing a diamine curing agent. The case 3) is difficult to clearly distinguish from the case 2), however, a method of using a polymer mixture of two or more polymers and a method of forming a binder layer to improve the adhesion between dissimilar materials have been reported. European Patent EP-0523644 of Kawashima et al proposes to improve the adhesive property by combining a fluoropolymer and a polyamide resin. One industrially useful application example is Denka DX film of Denka described in Japanese Unexamined Patent Publication (Kokai) No. 2-28239. This is a film manufactured fundamentally by melt-coextruding two layers different in the mixing ratio. For example, the external layer comprises a composition of PVDF/PMMA=80/20 and the internal layer comprises a composition of PVDF/PMMA=20/80. At the final stage, a pressure sensitive adhesive is coated on the internal layer with a larger amount of the PMMA (polymethylmethacrylate) component and having a higher polarity.

In the present invention, a most important point is the self-priming by the irradiation of an electron beam. Conventional techniques relating to the self-priming which is a most important point of the present invention are described below.

It is well known that irradiation of an electron beam causes cross-linking of a polymer such as polyethylene and thereby improves the heat resistance. For example, *Modern Fluoropolymers*, edited by John Scheirs, John Wiley & Sons, New York (1997) describes this. Furthermore, Makuuchi et al, *J. Poly. Sci. Poly. Chem. Ed.*, 14, 617–625 (1976) suggest that when polyvinylidene fluoride is irradiated with an electron beam, radicals are generated and form a cross-linked structure.

Japanese Unexamined Patent Publication (Kokai) No. 2209928 of L. Sidney at al and also their publication at an international meeting (*Proceedings of Rad Tech Asia '91*, Osaka, Japan (Apr. 15–18, 1991)) suggest that a fluororubber is cross-linked with a polyfunctional acrylate, for example, trimethylpropane acrylate (TMPTA) by the irradiation of an electron beam and that the TMPTA polymer is grafted to the main chain of a vinylidene fluoride and hexafluoropropylene copolymer. Japanese Unexamined Patent Publication (Kokai) No. 8-245850 of Hayami et al. states that the thermal properties of THV are improved by a cross-linking agent such as TMPTA or triallylisocyanate (TAIC) upon irradiation of an electron beam.

On the other hand, the irradiation of an electron beam is known also as a means for cross-linking a pressure sensitive adhesive or an adhesive. U.S. Pat. No. 2,956,904 of Hendriks reports that a rubber-based pressure sensitive adhesive is cross-linked by the irradiation of an electron beam.

U.S. Pat. No. 5,266,400 of Yarusso et al discloses a method of reducing the acceleration voltage for cross-linking a rubber-based pressure sensitive adhesive on paper (cellulose), polypropylene or polytetrafluoroethylene, which are prone to decay by an electron beam. However, if the acceleration voltage is increased to such a level that an electron beam acts on the substrate, the substrate decays.

U.S. Pat. No. 5,209,971 of Babu et al discloses a technique of irradiating an electron beam on a polyolefin-based pressure sensitive adhesive to cross-link the pressure sensitive adhesive, thereby improving the cohesion and heat resistance. U.S. Pat. No. 4,563,388 of Bonk et al reports that by irradiating an electron beam on an acryl-based pressure sensitive adhesive coated on a polyolefin-based film material, the adhesive property at the interface is improved. Similarly, Japanese Unexamined Patent Publication (Kokai) No. 63-150330 of Mori et al reports that when a metal sheet is stacked on a polyolefin film through an acryl-based monomer and an electron beam is irradiated thereon, the adhesion between the polyolefin and the acryl material is improved. U.S. Pat. No. 3,252,880 of Magat et al., Example 8 shows that when a teflon sheet was immersed in an acryl monomer and a γ-ray was applied thereto for 3 days, an acrylonitrile polymer was grafted to the surface of the teflon sheet and thereby the surface had tack. However, the polyacrylonitrile alone has a Tg of about 100° C. and this is not effective as a pressure sensitive adhesive.

Other than those, reports on the interface adhesion by an electron beam are collectively described below. Japanese Unexamined Patent Publication (Kokai) No. 3-250034 proposes "a method for forming a fluorine-containing polymer layer on a plastic substrate, comprising using a coating solution obtained by adding an oligomer or polymer to a polyfluorinated group-containing monomer and irradiating thereon an electron beam". According to this method, from 0.1 to 30 wt % of an oligomer (dissolved or dispersed in an monomer) is added to an electron beam polymerizable monomer having a polyfluoride group, this monomer is coated on the surface of a plastic, and an electron beam of from 0.5 to 20 Mrad is irradiated thereon to cure by polymerizing the monomer. This invention is characterized in that a thin polymer film comprising a polyfluoride group is formed within a short time on the surface of a plastic and the film is free of a freon solvent and has good adhesive property.

U.S. Pat. Nos. 7,036,039 and 4,861,408 both of J. Kelber et al. propose a method for improving the adhesion properties to the substrate by irradiating a low energy electron beam on the surface of a polymer thin film in a high vacuum. More specifically, the polymer surface, for example, the portion very close (50 to 10,000 Å) to the surface of PTFE is treated with a low energy electron beam (from 100 to 10,000 eV) in a high vacuum ($10^{-8}$ Torr) to remove fluorine from the carbon-fluorine bond on the substrate surface and convert it into a carbon—carbon or carbon-oxygen bond, thereby improving the adhesive properties to various materials. The treated film can be bonded to the brass, copper or steel surface using an ordinary adhesive.

U.S. Pat. No. 4,533,566 of J. Evans et al. proposes to improve the adhesive property by irradiating an electron beam on a polyester film as a substrate for a silicone release liner. This patent relates to production of a release liner and discloses a method for bonding a silicone thin layer onto a flexible polyester film. More specifically, while a polyester film is moved in an atmosphere having an oxygen concentration of 500 ppm or less, preferably 40 ppm or less, the polyester film is exposed to an electron beam of preferably from 2 to 20 Mrad, more preferably from 5 to 10 Mrad and thereby a thin silicon layer is formed on the film surface.

However, these techniques are disadvantageous in that the adhesion between the fluorine-containing material and the pressure sensitive adhesive is not sufficiently high, the process for attaining the adhesion is complicated, or the cost is high. Thus, a method capable of providing a sufficiently high adhesion between a fluorine-containing material and a pressure sensitive adhesive by a more simple method is demanded.

While the foregoing concerns the adhesive property between a fluorine-containing material and a pressure sensitive adhesive, the same can be applied to the adhesive property between a fluorine-containing material and an intermediate layer when a pressure sensitive adhesive is bonded to a fluorine-containing material through the intermediate layer. For example, it is difficult to form an intermediate layer such as primer layer or resin printing layer on the surface of a fluorine-containing material.

Toray has filed a series of inventions using a fluororesin film as the substrate. Among these, Japanese Unexamined Patent Publication (Kokai) No. 1-58617 discloses a repairing sheet comprising a fluororesin film having provided on one surface thereof an antifouling layer and on another surface thereof a pressure sensitive adhesive layer. The adhesion between the fluororesin film and the antifouling layer or pressure sensitive adhesive layer is accelerated by a surface treatment of the fluororesin film or undercoating therebetween. When an ultraviolet ray absorbing layer is provided between the fluororesin film and the pressure sensitive adhesive layer and a cross-linking agent is added to the ultraviolet ray absorbing layer, the cross-linking can be attained by heating or exposure to ultraviolet ray or electron beam. However, the adhesion between the fluororesin film and the ultraviolet absorbing layer is accelerated by a surface treatment or undercoating.

Japanese Unexamined Patent Publication (Kokai) No. 4146129 describes an ink resin composition comprising an energy ray curable resin, for forming a resin coated metal comprising a metal on the surface of which a fluoro-based resin film having a printing layer formed of the ink resin composition is heat fused. This fluororesin-based resin film having a printing layer is not a pressure sensitive adhesive sheet and is bonded to a metal substrate by heat fusion.

Japanese Unexamined Patent Publication (Kokai) No. 5-8353 describes a resin tube suitable for fuel piping of a vehicle, in which a resin tube having a polyamide resin external layer and a fluororesin internal layer is exposed to radiation to cause cross-linking and thereby introduce a cross-linked structure thereinto. This is a double extruded resin product and differs from the pressure sensitive adhesive sheet of the present invention.

Under these circumstances surrounding conventional techniques, a method for forming a pressure sensitive adhesive layer having a sufficiently high adhesive property on a fluorine-containing material sheet by a simple method irrespective of the presence or absence of an intermediate layer is demanded.

Means to Solve the Problems

The present invention has been made in order to solve the above described problems and relates to a method for forming a fluorine-containing pressure sensitive adhesive sheet dispensable with a surface treatment or a special adhesive. The present invention relates to a method for forming a multi-layer structure material comprising a fluoro-based material sheet with a poor adhesive property and a pressure sensitive adhesive (for example, acryl-based or olefin-based pressure sensitive adhesive) and a pressure sensitive adhesive sheet obtained by the method.

The fundamental feature of the method of the present invention resides in that a pressure sensitive adhesive (a hot-melt or polymerization product solution of monomer, syrup, oligomer or polymer, or an aqueous dispersion) or an intermediate layer material is coated or laminated on a substrate sheet and irradiated with an electron beam. By the irradiation of an electron beam, the pressure sensitive adhesive component is polymerized (cross-linked) and a radical of the pressure sensitive adhesive molecule reacts with a radical of the substrate molecule, so that a strong chemical bonding can be formed between two layers which are originally very difficult to adhere to each other, and the substrate sheet can be also cross-linked.

According to the structure of the pressure sensitive adhesive sheet of the present invention, a pressure sensitive adhesive layer or an intermediate layer is formed on a fluorine-containing material sheet. Therefore, it is not necessary at all to provide an adhesive layer between those two layers or apply a special treatment to the surface of the fluoro-based material. The reaction at the interface between dissimilar materials is very important factors. With respect to the cross-linking of the substrate and the pressure sensitive adhesive, the substrate sheet as a whole may be cross-linked or only a portion of the substrate portion in the vicinity of the interface with the pressure sensitive adhesive may be cross-linked according to the intensity of the electron beam. However, molecular bonds may be decayed by an electron beam in some materials, therefore, prudence is necessary in the selection.

According to the present invention, the followings are provided.

(1) A pressure sensitive adhesive sheet comprising a substrate which is an electron-beam non-decaying fluorine-containing material sheet and a pressure sensitive adhesive layer provided on the outer surface of the substrate with or without an intermediate layer therebetween, wherein the fluorine-containing material sheet has a chemical bond with the pressure sensitive adhesive layer or intermediate layer directly contacting with the fluorine-containing material sheet and the chemical bond is formed by the irradiation of an electron beam at least on the fluorine-containing material sheet.

(2) The pressure sensitive adhesive sheet as described in (1), wherein the fluorine-containing material sheet contains a polymer cross-linked by the irradiation of an electron beam.

(3) The pressure sensitive adhesive sheet as described in (1), wherein the pressure sensitive adhesive layer contains a pressure sensitive adhesive cross-linked by the irradiation of an electron beam.

(4) The pressure sensitive adhesive sheet as described in (1), wherein the fluorine-containing material sheet contains 10 wt % or more of fluorine. (5) The pressure sensitive adhesive sheet as described in (1), wherein the pressure sensitive adhesive sheet is transparent.

(6) The pressure sensitive adhesive sheet as described in (I), wherein the pressure sensitive adhesive sheet is a protective film.

(7) A method for producing a pressure sensitive adhesive sheet comprising a substrate which is an electron-beam non-decaying fluorine-containing material sheet and a pressure sensitive adhesive layer provided on the outer surface of the substrate with or without an intermediate layer therebetween, the method comprising coating a pressure sensitive adhesive layer or an intermediate layer on the surface of an electron-beam non-decaying fluorine-containing material sheet and irradiating an electron beam on the coated fluorine-containing material sheet to form a chemical bonding between the pressure sensitive adhesive layer or intermediate layer and the fluorine-containing material sheet.

(8) A method for producing a pressure sensitive adhesive sheet comprising a substrate which is an electron-beam non-decaying fluorine-containing material sheet and a pressure sensitive adhesive layer provided on the outer surface of the substrate with or without an intermediate layer therebetween, the method comprising irradiating an electron beam on an electron-beam non-decaying fluorine-containing material sheet and then coating a pressure sensitive adhesive layer or an intermediate layer on the surface of the fluorine-containing material sheet to form a chemical bonding between the fluorine-containing material sheet and the pressure sensitive adhesive layer or intermediate layer.

Mode for Carrying Out the Invention

Figure 1:
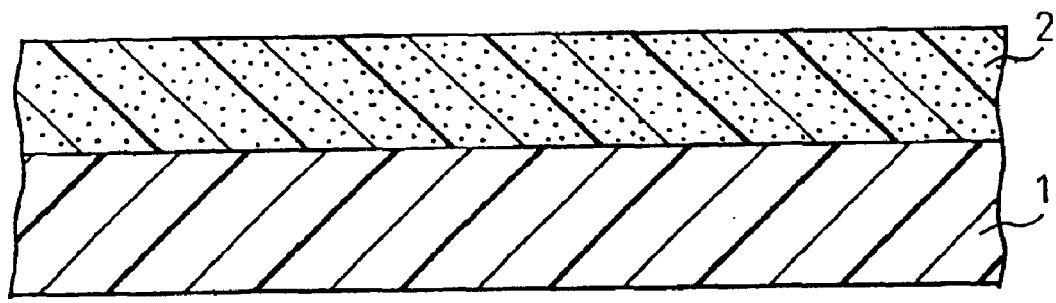
FIG. 1 is a cross section showing the pressure sensitive adhesive sheet of the present invention.

The fluorine-containing material (or fluorinated material) for use as the substrate of the pressure sensitive adhesive sheet of the present invention may be, for example, a homopolymer or copolymer of carbon fluoride, a blend thereof or a blend with non-fluorine material.

Examples of useful fluorine-containing monomers include hexafluoropropylene (HFP), tetrafluoroethylene (TFE), chlorotrifluoroethylene (CTFE), 2-chloropentafluoropropylene, perfluoroalkyl vinyl ether such as $CF_3OCF=CF_2$ and $CF_3CF_2OCF=CF_2$, 1-hydropentafluoropropylene, 2-hydropentafluoropropene, dichlorodifluoroethylene, trifluoroethylene, 1,1-dichlorofluoroethylene, vinyl fluoride and perfluoro-1,3-dioxane (see U.S. Pat. No. 4,558,142). Examples of useful fluorine-containing diolefin include perfluorodiallyl ether and perfluoro-1,3-butadiene. The fluorine-containing may be copolymerized with a fluorine-free terminal saturated monoolefin copolymer such as ethylene or propylene. In the polymer mixture, the fluorine-containing monomer preferably accounts for at least 50 wt % of the entire monomer. The fluorine-containing monomer may be copolymerized with iodine- or bromine-containing cured site monomer to prepare a peroxide curable polymer. Examples of appropriate cured site monomers include a terminal unsaturated monoolefin having from 2 to 4 carbon atoms such as bromodifluoroethylene, bromotrifluoroethylene, iodotrifluoroethylene and 4-bromo3,3,4,4-tetrafluorobutene-1.

A homopolymer or copolymer of such a fluorinated carbon or a mixture or cross-linked product thereof with another polymer may also be used.

Examples of the fluoropolymer which can be used include polymers and copolymers such as polyvinylidene fluoride (PVDF), polyvinyl fluoride (PVF), tetrafluoroethylene-perfluoroalkyl vinyl ether copolymer (PFA), tetrafluoroethylene-ethylene copolymer (ETFE), tetrafluoroethylene-ethylene-propylene copolymer, tetrafluoroethylene ethylene-perfluoroalkyl vinyl ether copolymer, tetrafluoroethylene-ethylene-heptafluoropentene copolymer, tetrafluoroethylene-ethylene-perfluorobutyl) ethylene copolymer, tetrafluoroethylene-ethylene-hexafluoropropylene copolymer, tetrafluoroethylene-propylene copolymer, tetrafluoroethylene-propylene-vinylidene fluoride copolymer, tetrafluoroethylene-hexafluoropropylene copolymer (FEP), tetrafluoroethylene-hexafluoropropylene-perfluoroalkyl vinyl ether copolymer, tetrafluoroethylene-hexafluoropropylene-vinylidene fluoride copolymer (THV), tetrafluoroethylene-hexafluoropropylene-vinylidene fluoride-tetrafluoroiodopropoxy trifluoroethylene copolymer, tetrafluoroethylene-vinylidene fluoride copolymer, chlorotrifluoroethylene-ethylene copolymer, chlorotrifluoro-ethylene-vinylidene fluoride copolymer, vinylidene fluoride-hexafluoropropylene copolymer and vinylidene fluoride trifluoroethylene copolymer. Furthermore, graft, block or blend polymer of these polymers may also be used and examples thereof include a graft polymer obtained by grafting chlorotrifluoroethylene-vinylidene fluoride copolymer to vinylidene fluoride copolymer, and a block polymer of tetrafluoroethylene-ethylene copolymer with vinylidene fluoride-hexafluoropropylene copolymer.

Examples of commercially available compounds of the above include the followings.

| HALAR | chlorotrifluoroethylene-ethylene copolymer (Allied Corp.) |
|---|---|
| KF POLYMER | polyvinylidene fluoride (Kureha Kagaku) |
| TEFLON FEP | tetrafluoroethylene-hexafluoropropylene copolymer (E. I. Du Pont) |
| ACLON | chlorotrifluoroethylene-vinylidene fluoride copolymer (Allied Corp.) |
| KYNARFLEX 2800 | vinylidene fluoride-hexafluoropropylene copolymer (Atochem) |
| THV 220G | tetrafluoroethylene-hexafluoropropylene-vinylidene fluoride copolymer (Dyneon) |
| THV 500G | tetrafluoroethylene-hexafluoropropylene-vinylidene fluoride copolymer (Dyneon) |
| AFLON COP | tetrafluoroethylene-ethylene-based copolymer (Asahi Glass) |
| CEFRAL SOFT | vinylidene fluoride-based graft polymer (Central Glass) |
| DAIEL T-530 | hexafluoropropylene-vinylidene fluoride-based block copolymer (Daikin) |
| JTE X1500 | tetrafluoroethylene-ethylene-based copolymer (Dyneon) |
| NEOFLONEP-610 | tetrafluoroethylene-ethylene-based copolymer (Daikin) |
| AFLAS 150E | tetrafluoroethylene-propylene-based copolymer (Asahi Glass) |
| AFLAS 200 | tetrafluoroethylene-propylene-vinylidene fluoride copolymer (Asahi Glass) |
| TEFLON PFA | tetrafluoroethylene-perfluoropropyl vinyl ether copolymer (E. I. Du Pont) |
| TEDLAR | polyvinyl fluoride (E. I. Du Pont) |

The fluorine-containing material constituting the substrate of the pressure sensitive adhesive sheet of the present invention contains fluorine and, therefore, is excellent in the chemical resistance, heat resistance, mechanical properties and electrical properties. To this purpose, the fluorine must be contained in an amount of at least 10 wt %, preferably 30 wt % or more, more preferably 40 wt % or more of the material. The fluorine may be contained even in an amount of 50 wt % or more and maximally 76 wt %. The substrate of the present invention is preferably cross-linkable under the irradiation of an electron beam. In the case of a substrate which decays by an electron beam, the acceleration voltage or linear density must be kept low and the irradiation time is also necessary to be prudentially decided For example, polytetrafluoroethylene is a polymer which decays under irradiation of an electron beam and is not preferred in the present invention. However, a modified polytetrafluoroethylene which is improved in the decaying property may be suitably used. Also, am electron-beam degradable material may be used in combination with a non electron-beam degradable or electron cross-linkable material if a film of the combination is not damaged by electron beam irradiation.

The thickness of the substrate of the pressure sensitive adhesive sheet of the present invention is not particularly limited. In the case of a protective sheet made of polyvinyl chloride, the thickness of the substrate may be as large as 5 mm as in some commercially products or a substrate called as "film", having a thickness of less than 100 $\mu$m may also be used. In general, the thickness of the substrate is approximately from about 50 to 1,000 $\mu$m. The shape of the substrate is not limited, and a sheet, an adhesive tape, a graphic film, an insulating sheet or the like may be used.

Various additives such as colorants (pigments and dyes), fillers, UV-absorbers may be added to the fluorine-containing material if necessary.

The pressure sensitive adhesive for use in the pressure sensitive adhesive sheet of the present invention is not particularly limited and known pressure sensitive adhesives all may be used. The pressure sensitive adhesive must have adhesion and preferably has releasability (capability of peel-removing the adhesive with no remaining on the adherend), however, re-adhesion is not an essential property. The pressure sensitive adhesion means a capability of pressure sensitive adhering (adhering) to an adherend material under pressure and the releasability means that the pressure sensitive adhesive remains on the pressure sensitive adhesive sheet side and does not transfer to the adherend material when the pressure sensitive adhesive sheet is peeled off from the adherend material after the pressure adhering. The re-adhesion means that the pressure sensitive adhesive sheet can be again adhered (pressure sensitive adhered) to an adherend after the releasing.

The pressure sensitive adhesive of the present invention has pressure sensitive adhesion at an ordinary temperature and accordingly, preferably has a glass transition temperature of an ambient temperature or less, more preferably 0° C. or less. A glass transition temperature of an ambient temperature or less gives an elasticity and pressure sensitive adhesion.

Because of its low glass transition temperature (an ambient temperature or less), the pressure sensitive adhesive shows tack at an ambient temperature but a tackifier may be added thereto.

Representative examples of the pressure sensitive adhesive include those described in U.S. Pat. Nos. 4,181,752 and 4,329,384 and U.S. Re-Issue Pat. No. 24,906.

The component constituting the pressure sensitive adhesive may be any of hydrocarbon-based (e.g., acrylate-based, rubber-based, polyolefin-based), silicone-based and fluorine-containing compounds. In the present invention, acrylate as a hydrocarbon-based compound which is commonly and widely used is particularly useful. However, since the substrate is a fluorine-containing material having excellent chemical resistance and superior weatherability, the adhesive is also preferably a fluorine-containing adhesive in some cases. In such a case, a silicone-based, fluorine-containing or polyolefin-based compound is used. The pressure sensitive adhesive may be blended with a cross-linking agent, an oligomer or a polymer, or may be formed by the polymerization of a pressure sensitive adhesive monomer alone. The pressure sensitive adhesive composition is preferably formed using an electron beam sensitive monomer, oligomer, polymer or cross-linking agent because bonding between the substrate and the pressure sensitive adhesive is accelerated by the irradiation of an electron beam, cohesion of the pressure sensitive adhesive increases, and the pressure sensitive adhesive is improved in the shear holding force or heat resistance.

Specific examples of the pressure sensitive adhesive are described in detail later. By adding an elastomer and a tackifier to the pressure sensitive adhesive, the pressure sensitive adhesive can be improved in the tackiness, low viscosity, coatability, heat stability, peel strength, shear strength and the like.

The tackifier includes resin, polyterpene and synthetic polyterpene, obtained from an unsaturated hydrocarbon monomer having from 5 to 9 carbon atoms. A large number of examples thereof are described in U.S. Pat. No. 5,209,972 (Babu).

The pressure sensitive adhesive may further contain, if desired, various additives in a small amount, such as a pigment, a dye, a plasticizer, a filler, a stabilizer, an ultraviolet absorbent, an antioxidant, a leveling agent, a surface active agent and a process oil.

The pressure sensitive adhesive of the present invention may be any of solventless-type adhesive (e.g., syrup, hot-melt of oligomer or polymer), organic solvent-type adhesive and water dispersion-type adhesive (e.g., emulsion, suspension).

The method for coating the pressure sensitive adhesive of the present invention on a fluorine-containing material substrate or on an intermediate layer formed thereon is not particularly limited. A solvent type coating method where the solvent is dried after the coating or a non-solvent type coating method may be used. As the solvent for use in the solvent type (usually, polymer solution) coating, ethyl acetate, methyl ethyl ketone or a mixed solvent thereof is commonly and widely used.

In the solventless type coating, the pressure sensitive adhesive composition (monomer, syrup, oligomer, polymer or a mixture thereof) may be directly coated without a solvent or may be coated by a spray or the like. Particularly in the case of a polymer, hot-melt coating may also be used.

In order to allow the pressure sensitive adhesive to be readily wettable to the fluorine-containing material substrate, a fluorine containing surface active agent, a coupling agent, a fluorocarbon having a functional group such as hydroxyl group, carboxyl group or ether group (for example, perfluoropolyether diol (DYNAMAR FC-2202, produced by 3M)) may be added to the pressure sensitive adhesive composition. Furthermore, a syrup may be obtained by adding a photoinitiator to a monomer which forms a pressure sensitive adhesive, and controlling the exposure of the mixture to an ultraviolet ray such that increase in the molecular weight or viscosity is limited to a syrup state, and the syrup may be coated on a substrate, by which the wettability is improved.

Specific examples of the coating method which can be used include bar coating, wire bar coating, Meyer bar coating, four-roll coating, gravure roll coating, spray coating, notch par coating and die bar coating.

The pressure sensitive adhesive sheet of the present invention is characterized in that a chemical bonding is formed between the fluorine-containing material substrate and the pressure sensitive adhesive layer or intermediate layer by the irradiation of an electron beam. In conventional pressure sensitive adhesive sheets, when a fluorine-containing material is used as the substrate, the bonding force between the substrate and the pressure sensitive adhesive layer is insufficient because the pressure sensitive adhesive has no adhesion to the fluorine-containing material substrate. Therefore, in order to increase the bonding force between the substrate and the pressure sensitive adhesive layer, it has been proposed to subject the substrate surface to a special treatment (e.g., metal sodium treatment, corona discharge) or interpose a special intermediate bonding layer (a layer formed of a material having adhesion to a fluorine-containing material and also to a pressure sensitive adhesive) therebetween. However, both the performance (e.g., adherence, transparency) and the profitability are difficult to attain at the same time. On the other hand, according to the present invention, it has been found that only by irradiating with an electron beam, a chemical bond is formed between the fluorine-containing material substrate and the pressure sensitive adhesive layer or intermediate layer, thereby remarkably increasing the bonding force therebetween, as a result, a pressure sensitive adhesive sheet comprising a practical fluorine-containing material sheet can be obtained, in which the pressure sensitive adhesive layer is sufficiently firmly bonded to the fluorine-containing material substrate. On the surface of a fluorine-containing material substrate on which an electron beam is irradiated, the bonds of polymers are disconnected to generate radicals and the active sites of the pressure sensitive adhesive are bonded thereto. Since the pressure sensitive adhesive also generates radicals when irradiated by electron beam, mutual bonding between the substrate and pressure sensitive adhesive is facilitated. Furthermore, it is also possible to first form an intermediate layer in place of the pressure sensitive adhesive layer on the surface of a fluorine-containing material substrate and then form a chemical bond between the intermediate layer and the fluorine-containing material substrate by the irradiation of an electron beam. This is described in detail later. There arises no problem with respect to the adhesion between the thus-formed intermediate layer and the pressure sensitive adhesive layer.

In the present invention, an electron beam must be irradiated at least on the fluorine-containing material substrate. The electron beam is preferably irradiated both on the fluorine-containing material substrate and the pressure sensitive adhesive layer or intermediate layer formed thereon because this is simple and the bonding force is higher. When an electron beam is irradiated on the fluorine-containing material substrate, a cross-linking structure can be introduced into the polymer of the fluorine-containing material substrate.

In the case where a chemical bond is formed between the fluorine-containing material substrate and the pressure sensitive adhesive layer or intermediate layer by the irradiation of an electron beam, a structure of the concerned layers and interlayer bonding is formed, which is different from the structure obtained when a chemical bond is formed by other methods such as metal sodium treatment or corona discharging. The pressure sensitive adhesive sheet of the present invention is characterized by having such a structure derived from an electron beam irradiation.

As another characteristic feature of the pressure sensitive adhesive sheet of the present invention, when a chemical bond is formed between the fluorine-containing material substrate and the pressure sensitive adhesive layer or intermediate layer by the irradiation of an electron beam, the surface of the fluorine-containing material substrate is not subjected to surface treatment such as metal sodium treatment or corona discharging. The surface of a fluorine-containing material substrate subjected to surface treatment such as metal sodium treatment has traces of the surface treatment such as metal sodium treatment. However, the present invention is free of such traces. For example, in the metal sodium ement, the surface of the fluorine-containing material substrate is blackened. When the substrate is blackened, the pressure sensitive adhesive sheet cannot be transparent.

According to the present invention, at the time when a pressure sensitive adhesive is coated on the surface of a fluorine-containing material substrate and bonded by the irradiation of an electron bean, polymerization or crosslinking of the pressure sensitive adhesive simultaneously proceeds by the irradiation. Thus, the present invention is advantageous as compared with conventional techniques in that a specific process for forming a bonding between the fluorine-containing material substrate and the pressure sensitive adhesive layer is not necessary to be additionally provided. Furthermore, since the substrate can also be cross-linked by the irradiation of an electron beam, the chemical resistance and heat resistance of the substrate can be improved.

The electron beam may be irradiated either from the pressure sensitive adhesive layer or intermediate layer side or from the substrate side. The conditions for the irradiation of an electron beam may be sufficient if radicals are generated on the substrate surface in contact with the PSA or intermediate layer. The conditions vary depending on the kind and thickness of the fluorine-containing material substrate or the pressure sensitive adhesive, however, it is suitably 10 keV or more, (3 Mrad or more). More preferably it is from 50 to 200 keV (3 to 100 Mrad).

According to the present invention, it has also been found that a chemical bonding can be formed between the fluorine-containing material substrate and the pressure sensitive adhesive layer or intermediate layer even by irradiating an electron beam on the substrate to generate radicals on the substrate surface and immediately thereafter coating a pressure sensitive adhesive layer or intermediate layer on the substrate surface. However, as compared with the case where a pressure sensitive adhesive layer or intermediate layer is formed on the substrate surface and then an electron beam is irradiated thereon, the intensity of the chemical bonding formed is slightly reduced. Although it is theoretically most preferred to maintain the vacuum between the irradiation of an electron beam on the substrate surface and the coating of the pressure sensitive adhesive or intermediate layer so that the radicals on the substrate surface are prevented from reaction with oxygen radicals, an interface adhesive strength sufficiently tolerable in practice can be attained even by irradiating electron beam, immediately followed by coating an acrylate syrup thereon in an ordinary atmosphere (oxygen concentration: about 20%) and curing it by an ultraviolet ray.

The intensity of the chemical bonding formed between the fluorine-containing material substrate and the pressure sensitive adhesive layer or intermediate layer in the present invention can be evaluated by a peeling test of the pressure sensitive adhesive sheet obtained. A specific method is described in the Examples.

In a result of the peeling test of a pressure sensitive adhesive sheet according to the present invention in which a chemical bond is formed between the fluorine-containing material substrate and the pressure sensitive adhesive layer, breakage does not occur between the substrate and the pressure sensitive adhesive and the breakage mode is in principle a breakage between the pressure sensitive adhesive and the adherend or a cohesion break of the pressure sensitive adhesive, by which, it is verified that a strong chemical bond is formed between the fluorine-containing material substrate and the pressure sensitive adhesive layer. Even if breakage occurs between the pressure sensitive adhesive and the adherend, there arises no problem in practice as far as the strength is a few hundreds g/inch or more, particularly 500 g/inch or more. This is because an ordinary vinyl tape obtained by coating a pressure sensitive adhesive on a polyvinyl chloride film has an adherence to a glass or stainless steel plate of some 100 grams/inch.

As described above, in the present invention, one or more intermediate layers may be provided between the fluorine-containing material substrate and the pressure sensitive adhesive layer and a chemical bond may be formed between the fluorine-containing material substrate and the intermediate layer directly contacting therewith by irradiating an electron beam.

For example, the surface of the fluorine-containing material substrate may be primed with a material having high wettability to the pressure sensitive adhesive. The coating is taken up into a roll after the priming and therefore, the primer preferably has no tackiness (adhesion). Examples of the primers which can be used include t-butyl acrylate monomer and i-bornyl acrylate monomer. In the present invention, it is preferable that the primer has a smaller thickness, more preferably a thickness of a few $\mu$m or less. Important in the present invention is how to indefinitely improve the adhesion between the fluorine-containing film and the pressure sensitive adhesive. To this purpose, irradiation by an electron beam is performed preferably simultaneously with polymerization or cross-linking of the pressure sensitive adhesive component or cross-linking of the adherend. More specifically, the present invention includes in the scope thereof the case where an acrylate or vinyl monomer which does not become a pressure sensitive adhesive is coated on a fluorine-containing film, polymerization or interface reaction thereof is caused by an electron beam, and thereafter a pressure sensitive adhesive is coated on the acrylate polymerization product having an excellent adhesive property.

Other examples of the intermediate layer include an elastic layer formed of a urethane material or acrylic rubber material or the like for imparting elasticity to the pressure sensitive adhesive sheet, a printing layer of a monochromic solid layer or comprising letters and a background or an image, and a backing layer (suitably acryl layer or urethane layer) for providing the handleability as a film even when the fluorine-containing material substrate is reduced in the thickness to curtail the cost, however, the intermediate layer is not particularly limited.

The object and use of these intermediate layers are briefly described below.

Primer Layer

A primer layer is advantageous in that, for example, after an electron beam curing or interface reaction of a very thin primer layer followed by taking up of the sheet at a high line speed, an ordinary pressure sensitive adhesive solution can be coated thereon or a pressure sensitive adhesive monomer thereon can be cured by an ultraviolet ray. In this case, the coating of a pressure sensitive adhesive can be performed at a separate place from the irradiation of an electron beam.

Elastic Layer

An elastic layer formed of a foaming material such as urethane material or acrylic rubber material is provided as an intermediate layer so that even when the fluorine-containing material surface layer having durability is reduced in the thickness, the handleability as film can be maintained or the cost can be curtailed. Furthermore, due to the presence of an elastic layer, the curved face conformability (application performance to a curved face) as a laminate film with an adhesive or the stability or durability against abrupt change of temperatures can be improved. In addition, when an elastic layer is formed on the under side of the substrate to serve as a protective film, scratches generated by colliding of a pebble or rubbing with a hard material can be prevented or reduced from reaching the material protected, or the fluorine-containing film itself can be prevented from or reduced in having scratches.

Printing Layer

Examples of the printing layer include a monochromatic solid layer or a printing layer comprising a letter/image and a background. For example, in the case of an ordinary coating material, the coating is applied after the surface is polished or cleaned with a solvent, however, such a process is not necessary or can be shortened in the case of using a fluorine-containing film with a high weatherability adhesive, which is colored or printed by having a printing layer. Even if the printing layer is not used in place of the finish coating, the protective film is sometimes required to be colored and the coloring also varies depending on the case, for example, coloring for preventing viewing of the background (masking) or translucent coloring. Furthermore, a logo mark or company name is printed on the protective film itself in some cases.

Backing Layer

For the purpose of providing the handleability as a film despite the reduction in the thickness of the fluorine-containing material surface layer having durability so as to curtail the cost, a backing layer is provided between the fluorine material surface layer and a pressure sensitive adhesive layer, and an acryl layer, a urethane layer or a soft vinyl layer is suitably used.

The number of these intermediate layers is not limited and for example, a structure such as a structure of fluorine-containing material substrate/primer layer/pressure sensitive adhesive layer, a structure of fluorine-containing material substrate/primer layer/elastic layer/pressure sensitive adhesive layer, or a structure of fluorine-containing material substrate/primer layer/colored layer (printing layer)/pressure sensitive adhesive layer may be employed. The present invention is characterized in that since the adhesion between a fluorine-containing material and another layer is low, the fluorine-containing material substrate and an intermediate layer or pressure sensitive adhesive layer directly contacting therewith are chemically bonded (adhered) by the irradiation of an electron beam.

The method for coating or laminating an intermediate layer on a fluorine-containing material substrate is not particularly limited and may be the same as the method described in connection with the coating of a pressure sensitive adhesive layer. Other than this, hot-melt coating or co-extrusion of a fluoropolymer and a melt may be used particularly when the viscosity is high.

An example of the pressure sensitive adhesive sheet of the present invention is described below by referring to the drawings attached hereto.

Figure 2:
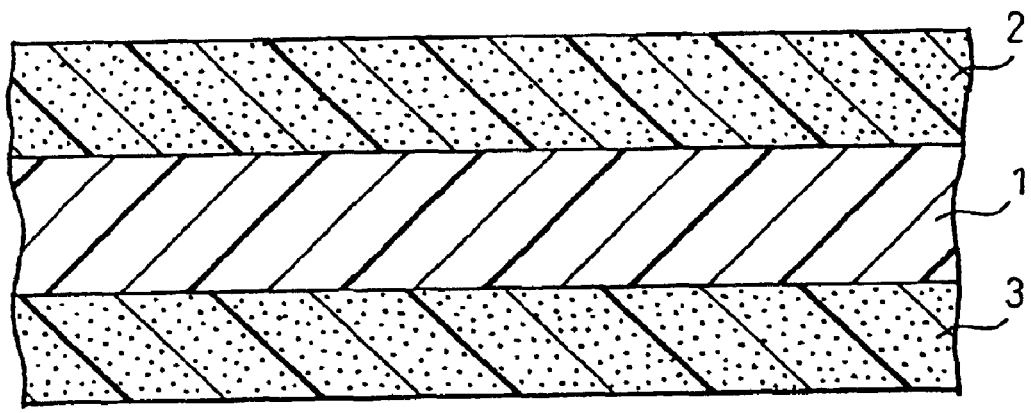
FIG. 2 is a cross section showing the double-coated pressure sensitive adhesive sheet of the present invention.
Figure 3:
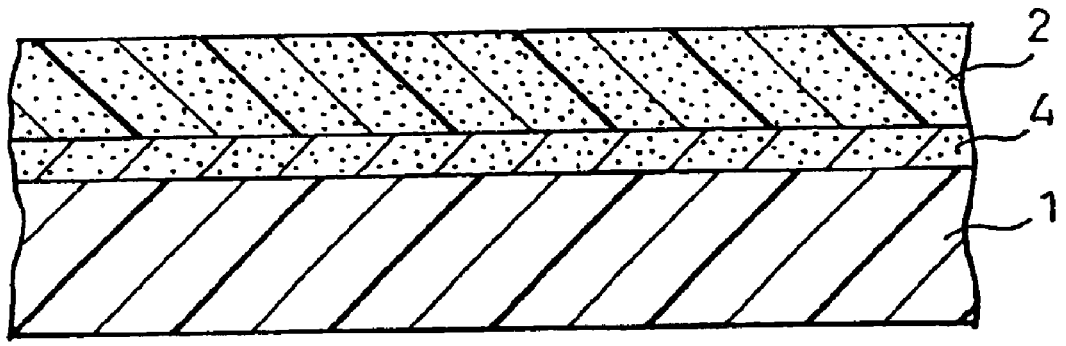
FIG. 3 is a cross section showing the pressure sensitive adhesive sheet having a primer of the present invention.
Figure 4:
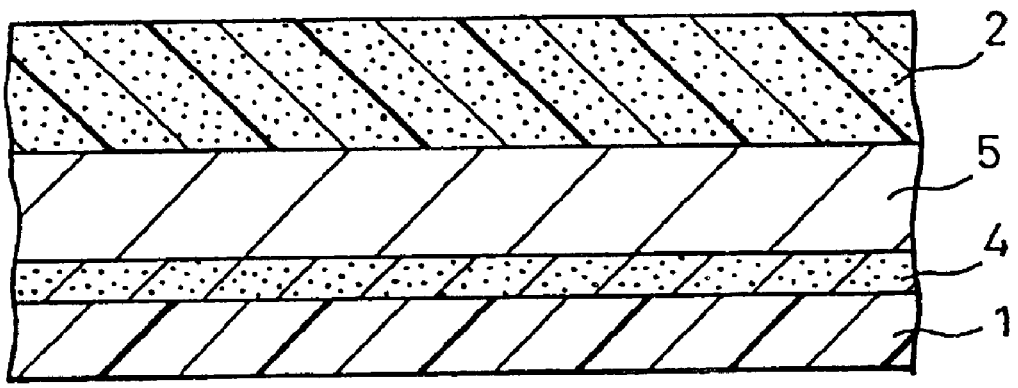
FIG. 4 is a cross section showing the pressure sensitive adhesive sheet having an intermediate layer of the present invention.

FIG. 1 shows an example where a pressure sensitive adhesive layer 2 is formed directly on a fluorine-containing material substrate 1 without an intermediate layer. FIG. 2 shows an example where pressure sensitive adhesive layers 2 and 3 are formed directly on both surfaces of a fluorine-containing material substrate 1. FIG. 3 shows an example where a primer layer 4 is formed on a fluorine-containing material substrate 1 and a pressure sensitive adhesive 2 is formed thereon. FIG. 4 shows an example where a primer layer 4 is formed on a fluorine containing material substrate 1, an intermediate layer 5 such as an elastic layer, a printing layer or a backing layer is formed thereon, and a pressure sensitive adhesive 2 is formed further thereon. In the example of FIG. 4, the intermediate layer 5 may be formed directly on the fluorine-containing material substrate 1 without forming the primer layer 4. In these examples, the pressure sensitive adhesive sheet of the present invention is characterized in that the bonding between the fluorine-containing material substrate 1 and the layer directly contacting therewith (pressure sensitive adhesive layer 2 or 3 of FIGS. 1 and 2, primer layer 4 of FIGS. 3 and 4, or intermediate layer 5 of FIGS. 3 and 4 where the primer layer 4 is omitted) is a chemical bond formed by the irradiation of an electron beam. Other layers may also be chemically bonded by the irradiation of an electron beam.

EXAMPLES

The present invention is described below by referring to the Examples, however, the present invention is by no means limited thereto.

(A) Bonding of Fluorine-Containing Substrate and Pressure Sensitive Adhesive

Substrate Film

Carbon fluoride substrate films used in Examples and Comparative Examples are shown in Table 1 below.

TABLE 1

| | Substrate film | | |
|---|---|---|---|
| Abbreviation | Trade Name or Composition | Thickness, µm | Seller |
| THV500 | TFE-HFP-VDF terpolymer | 200 | Dyneon LLC |
| THV200 | TFE-HFP-VDF terpolymer | 350 | Dyneon LLC |
| PFA | PFA6510n, TFE-PPVE copolymer | 100 | Dyneon LLC |
| FEP | FEP6107, TFE-HFP copolymer | 100 | Dyneon LLC |
| PVDF | KYNAR 740 | 260 | Atochem |
| VDF-HFP | KYNAR 2800, VDF-HFP copolymer | 260 | Atochem |
| ECFTE | HALAR 300, ethylene-CTFE copolymer | 235 | Ausimont |
| ETFE | ET 6235J ethylene-TFE copolymer | 120 | Dyneon LLC |
| PTFE | NAFLON Tape 9001 | 100 | Nichias |
| m-PTFE | TFM-1700, modified PTFE | 100 | Dyneon LLC |
| FLUOREL | FE-5831Q fluororubber | 1200 | Dyneon LLC |
| Blend | PVDF/PMMA80/20 | 200 | — |

In Table 1,
THV is a TFE-HFP-VDF terpolymer (TFE is tetrafluoroethylene, HFP is hexafluoropropylene and VDF is vinylidene fluoride), PFA is a TFE-PPVE copolymer, PPVE is perfluoropropyl vinyl ether, FEP is a TFE and HFP copolymer, PVDF is polyvinylidene fluoride, ECTFE is a ethylene-CTFE copolymer, CITE is chlorofluoro-ethylene, PTFE is an ethylene-TFE copolymer, PTFE polytetrafluoroethylene and M-PTFE is a modified polytetrafluoroethylene;

PFA, FEP, PVDF, FCF-HFP, E-CTFE, E-TFE were molded by heat pressing to manufacture films, PTFE was a commercially available film, and M-PTFE was subjected to ram molding and then skiving to prepare a film;

THV500 and THV200 films were prepared from a T-die extruder,

LLDPE and EVA films were manufactured from respective pellets using a hot press;

FLUOREL™ film was manufactured from the following starting materials; namely, 100 parts of fluororubber FE-5831Q (TFE-HFP-VDF terpolymer, available from Dyneon LLC), 30 parts of MT Carbon (N990, available from Cancarb Co.), 3 parts of magnesium oxide MgO #150 (produced by Kyowa Kagaku) and 6 parts of Ca(OH)$_2$ (produced by Ohmi Kagaku) were thoroughly mixed by a two-roller rubber mill and the mixture was molded by vulcanization and compression at 170° C. for 10 minutes using a hot press to have a thickness of 1.2 mm and thereafter, the sheet obtained was subjected to secondary vulcanization in an oven at 230° C. for 24 hours; and the blend film was a film manufactured from a blend of fluoropolymer and hydrocarbon polymer by melt-kneading PVDF (KF1100 produced by Kureha Kagaku Kogyo) and PMMA (Acrypet M001, produced by Mitsubishi Rayon) at a ratio of 80:20 by weight and then heat-press molding the mixture.

Pressure Sensitive Adhesive

Pressure sensitive adhesives used in Examples and Comparative Examples are shown in Table 2 below.

TABLE 2

Pressure Sensitive Adhesive

| Abbreviation | Composition |
|---|---|
| Solventless-type adhesive syrup for EB | IOA/AA = 90/10 + 0.01 wt % of photoinitiator |
| Solventless-type adhesive syrup for UV | IOA/AA = 90/10 + 0.5 wt % of photoinitiator |
| Solvent-type acrylic pressure sensitive adhesive | IOA/AA = 90/10, 44 wt % of ethyl acetate solution |
| IOA/FC-2211 for EB | IOA/FC-2211 = 80/20 |
| IOA/FC-2211 for UV | IOA/FC-2211 = 80/20 + 0.5 wt % of photoinitiator |
| BA/FC-2211 for EB | BA/FC-2211 = 60/40 |
| BA/FC-2211 for UV | BAFC-2211 = 60/40 + 0.5 wt % of photoinitiator |
| IOA/FX-13 for EB | IOA/FX-13 = 90/10 |
| IOA/FX-13 for UV | IOA/FX-13 = 90/10 + 0.5 wt % of photoinitiator |
| Poly(α-olefin) | poly(α-olefin) |
| SIS | styrene-isoprene-styrene |
| L-silicone | linear silicone |
| X-silicone | cross-linked silicone |

In Table 2, IOA is isooctylacrylate, AA is acrylic acid, FC is fluororubber, BA is butyl acrylate, VX is a fluorinated acrylate monomer, EB is electron beam, and UV is ultraviolet.

When a solventless-type pressure sensitive adhesive, solventless-type PSA syrup, IOA/FC-2211, BA/FC-2211 or IOX/FX-13 was used, the adhesive was coated on a substrate film (for example, THV) and the surface was covered by a silicone release liner (SP-PET-01-50 Bu, available from Panac Co., thickness: 50 μm). The thickness of the pressure sensitive adhesive before curing was controlled by a knife bar coater to about 60 μm. The thickness of the adhesive after curing was from 30 to 60 μm due to curing shrinkage.

In the case of a solvent-type pressure sensitive adhesive (Solvent-type acrylic PSA, poly-alpha-olefin, SIS, L-silicone or X-silicone), the adhesive was coated on a substrate film, the solvent was thoroughly evaporated, and then the adhesive surface was protected by covering it with a silicone release liner. If a silicone-based liner is used for the silicone-based pressure sensitive adhesive (L-silicone or X-silicone), the liner cannot be peeled off, therefore, a fluorine-containing liner was used. The film was manufactured such that the thickness of the solvent-type pressure sensitive adhesive had a dry thickness of from 30 to 60 μm.

With respect to the composition of the pressure sensitive adhesive, there was a slight difference between those for electron beam curing (Examples) and those for ultraviolet ray curing or those where the solvent was merely evaporated.

Comparative Examples (1) Solventless-Type Pressure Sensitive Adhesive Syrup

The term "syrup" as used herein means a mixture subjected to thickening to have a viscosity capable of coating, preferably from about 300 to 20,000 cPs, though the viscosity varies depending on the coating method used. The syrup includes a mixture made by partially polymerizing monomers to form a syrup and a monomer mixture subjected to thickening treatment with silica or the like. The syrup of the present invention is preferably produced by partially polymerizing monomers by a free radical initiator which is known to one skilled in the art and is activated by a heat energy or a radiation energy such as ultraviolet ray. In some cases, it may be preferred to add another monomer to the syrup or add a photoinitiator and other additives. At least one free radical initiator in an effective amount is added to an acrylate monomer or a syrup.

In the case of a pressure sensitive adhesive for electron beam curing, 0.01 wt % of a photoinitiator (DAROCUR 1173, produced by Ciba Specialty Chemicals K.K.) was mixed to an IOA/AA (90/10) solution to increase the viscosity of a pressure sensitive adhesive during application thereof. The entire ratio was IOA/AA/1173=90/10/0.0001. The solution was placed in a glass container, nitrogen was charged into the container, and an ultraviolet ray was irradiated thereon to increase the viscosity of the solution up to the level capable of coating. While coating this pressure sensitive adhesive syrup on a substrate film, a silicone liner was covered thereon. The coating obtained was irradiated with an electron beam.

In the case of a pressure sensitive adhesive for ultraviolet ray curing (Comparative Examples), 0.5 wt % of a photoinitiator (Darocur 1173) was mixed to an IOA/AA (90/10) solution. After the mixture, the composition was IOA/AA/1173=60/40/0.005. This solution was placed in a glass container, nitrogen was charged into the container, and an ultraviolet ray was irradiated thereon to increase the viscosity of the solution up to the level capable of coating. While coating this pressure sensitive adhesive syrup on a substrate film, a silicone liner was covered thereon. Then, the pressure sensitive adhesive was cured by irradiating thereon an ultraviolet ray of about 2,000 mJ/cm$^2$.

(2) Solvent-Type Acrylic Pressure Sensitive Adhesive

This is an ethyl acetate solution of an acryl-based macromolecular copolymer.

For comparison (only solvent evaporation), the acryl-based macromolecular copolymer was coated on a substrate film, the solvent was thoroughly evaporated, and a silicone liner was covered to protect the surface of the pressure sensitive adhesive.

As a sample for electron beam irradiation (Example), another sample was manufactured in the same manner and irradiated with an electron beam.

(3) IOA/FC-2211 and BA/FC-2211

FC-2211 (FLUOREL™ Fluoroelastomer, available from Dyneon LLC, a two-component copolymer of hexafluoropropylene and vinylidene fluoride) was dissolved in IOA or BA. The ratio was IOA/FC-22 11=80120 or BA/FC-2211=60/40. The resulting solutions each had an appropriate viscosity for the coating and therefore, while coating it on a substrate film, a silicone liner was covered thereon to prepare samples for electron beam irradiation (Examples). Then, each sample was irradiated with an electron beam.

For comparison (ultraviolet ray curing), 0.5 wt % of a photoinitiator (Darocur 1173) was mixed with an IOA/FC-221 solution or BA/FC-2211 solution. After the mixing, the composition was IOA/FC-2211/1173=80/2010.4 or BA/FC2211/1173=60/40/0.3. Each solution had an appropriate viscosity for the coating and therefore, while coating it on a substrate film, a silicone liner was covered thereon. Then, the pressure sensitive adhesives each was cured by irradiating thereon an ultraviolet ray of about 2,000 ml/cm$^2$.

(4) IOX/FX-13

FX-13 (FLUORAD™, produced by 3M, perfluoroalkylacrylate) was dissolved in IOA at a ratio of IOA/FX-13=90/10. This solution had an appropriate viscosity for the coating and therefore, while coating it on a substrate film, a silicone liner was covered thereon to prepare a sample for electron beam irradiation (Example). Then, the coating was irradiated by an electron beam.

For comparison (ultraviolet ray curing), 0.5 wt % of a photoinitiator (Darocur 1173) was mixed to an IOA/FX-13 solution. After the mixture, the composition was IOA/FX-13/1173=90/10/0.005. This solution had an appropriate viscosity for the coating and therefore, while coating the solution on a substrate film, a silicone liner was covered thereon. Then, the pressure sensitive adhesive was cured by irradiating thereon with an ultraviolet ray of about 2,000 mJ/cm$^2$.

(5) Poly($\alpha$-olefin)

Poly(1-octene) was manufactured according to U.S. Pat. No. 5,209,971 (Example 14). The viscous polymer obtained was dissolved in toluene to have a solid content of 15 wt %. The resulting solution had an appropriate viscosity for the coating.

For comparison (only solvent evaporation), the solution was coated on a substrate film, the solvent was thoroughly evaporated, and a silicone liner was covered thereon to protect the surface of the pressure sensitive adhesive.

As a sample for electron beam irradiation (Example), another sample was manufactured in the same manner and irradiated with an electron beam.

(6) SIS

A styrene-isoprene-styrene type solvent-based pressure sensitive adhesive (produced by 3M) was used This was diluted with a toluene/IPA mixed solvent and had a solid content of 40 wt %.

For comparison (only solvent evaporation), the solution was coated on a substrate film, the solvent was thoroughly evaporated, and a silicone liner was covered thereon to protect the surface of the pressure sensitive adhesive.

As a sample for electron beam irradiation (Example), another sample was manufactured in the same manner and irradiated with an electron beam.

(7) L-Silicone

For comparison (only solvent evaporation), SD4570 PSA (a toluene 10–20 wt % solution or xylene 30—30 wt % solution of linear silicone polymer, produced by Toray-Dow Corning Silicone) was coated on a substrate film, the solvent was thoroughly evaporated, and a fluorine-containing liner described above was covered thereon to protect the surface of the pressure sensitive adhesive.

As a sample for electron beam irradiation (Example), another sample was manufactured in the same manner and irradiated with an electron beam.

(8) X-Silicone

For comparison (solvent evaporation and thermal cross-linking), 3 wt % of a cross-linking agent SRX212, produced by Toray-Dow Corning Silicone) was mixed with an SD 4570 solution. This solution was coated on a substrate film, the solvent was thoroughly evaporated at 100° C., and the pressure sensitive adhesive was cross-linked by the cross-linking agent (for about 5 minutes). Thereafter, a fluorine-containing liner was covered thereon to protect the surface of the pressure sensitive adhesive.

As a sample for electron beam irradiation (Example), another sample was manufactured in the same manner and irradiated with an electron beam.

Irradiation with Electron Beam

For the electron-beam irradiated samples, the electron beam was irradiated from the release liner side in a nitrogen atmosphere (oxygen concentration: about 50 ppm) at normal temperature under the conditions such that the acceleration voltage was from 150 to 250 kV, the dose was from 5 to 20 Mrads, and the line speed was from 2 to 5 m/min. The apparatus used was System 7824 manufactured by Energy Science, Inc.

Evaluation of Adhesive Property and Breakage Mode of Pressure Sensitive Adhesive Each film samples (Examples and Comparative Examples) having a pressure sensitive adhesive layer was cut into a width of 1 inch, superposed on an anodized aluminum sheet (width: 30 mm, thickness: 300 $\mu$m, length: 150 mm), and press-bonded by once reciprocating a 2-kg rubber roller on the film. Three test pieces were used per one test condition and an average was obtained. Each sample was subjected to a T-peeling test at a pulling rate of 300 nm/min and an ordinary temperature.

Results (1) Verification of Adhesion Between Anodized Aluminum and Solvent-Based Acrylic Pressure Sensitive Adhesive RD-2738

Solvent-based acrylic pressure sensitive adhesive was coated on a primed PET film (UV-25-150, produced by Unitica, thickness: 25 $\mu$m), and the solvent was thoroughly evaporated. After the evaporation, the pressure sensitive adhesive had a thickness of about 50 $\mu$m. The adhesive surface was superposed on the surface of an anodized aluminum, and a 2-kg rubber roller was once reciprocated on the PET film. The T-peel strength was 1,826 g/inch on average. The decay was observed visually and found to take place between the aluminum surface and the pressure sensitive adhesive. The standard T-peel strength of an acrylate-based standard pressure sensitive adhesive on an anodized aluminum was set to be about 1,800 g/inch.

(2) Relationship of Electron Beam Irradiation with T-Peel Strength and Polymerization Degree of Pressure Sensitive Adhesive The relationship of the electron beam irradiation with the T-peel strength and the polymerization degree of the pressure sensitive adhesive was evaluated from the constructions of the solventless-type pressure sensitive adhesive syrup and the THV500 film. The results obtained are shown in Table 3. The electron beam irradiation was from the liner side (thickness: 50 $\mu$m). Good results were obtained in wide ranges of electron beam irradiation conditions. In the following experiments, the condition of 250 kV/20 Mrads was used throughout.

TABLE 3

Relationship of Electron Beam Irradiation with
T-Peel Strength and Polymerization Degree

|  | KV | Mrads | Thickness of PSA | Polymerization Degree | T-Peel Strength, g/inch |
|---|---|---|---|---|---|
| #1 | 250 | 5 | 30 | Good | 1428 (broken on interface between aluminum and PSA) |
| #2 | 150 | 10 | 30 | Good | 1553 (broken on interface between aluminum and PSA) |
| #3 | 200 | 10 | 30 | Good | 1598 (broken on interface between aluminum and PSA) |
| #4 | 250 | 10 | 50 | Good | 1625 (broken on interface between aluminum and PSA) |
| #5 | 250 | 12.5 | 50 | Good | 1604 (broken on interface between aluminum and PSA) |
| #6 | 250 | 15 | 50 | Good | 1712 (broken on interface between aluminum and PSA) |
| #7 | 250 | 20 | 50 | Good | 1618 (broken on interface between aluminum and PSA) |
| #8 | 250 | 30 | 50 | very limited foamation | 1351 (broken on interface between aluminum and PSA) |

(3) Reaffirmation of Adhesion Between Solventless-Type Pressure Sensitive Adhesive Syrup and THV500 by Electron Beam Radiation Using Sample #7 of Table 3, the adhesion between the solventless-type pressure sensitive adhesive syrup and THV500 was reaffirmed.

After the irradiation with an electron beam of material made as in sample #7, 100 or more cross-cut samples (each about 2 mm in size) were formed by cutting the solventless-type pressure sensitive adhesive layer with a sharp razor to the depth reaching the THV surface in accordance with JIS K-5400 (Japanese Industrial Standard K-5400, concerning Testing Methods for Organic Coatings.). Thereafter, the adhesive surface was attached onto anodized aluminum oxide as described in (1) above, cleaned glass or cleaned stainless steel (SUS), and a rubber roller was pressed thereon many times to firmly bond the pressure sensitive adhesive. After 24 hours, the THV film was very swiftly peeled off by a hand at an angle of 90° or 180°. The crosscut samples of the pressure sensitive adhesive were not peeled off from the THV side at all.

(4) T-Peel Strength and Breakage Mode

The results of T-peel strength and breakage mode are shown below.

All samples were irradiated by an electron beam under the condition of 250 kV/20 Mrads. The shocky breakage as used herein means a slip-stick type breakage mode, in other words, a breakage mode such that a maximum and a minimum alternately appear on a chart showing the relationship between the peel strength and the displacement, and is expressed by "min-max". The stable breakage means a breakage which continues in the state of an almost constant value. "Immeasurable" means that at the peeling of the release liner, the pressure sensitive adhesive was entirely transferred to the release liner side to which adhesion should not occur.

TABLE 4

| Example | Substrate | PSA | Curing Method | T-Peel Strength and Breakage Mode | Breakage Site etc. |
|---|---|---|---|---|---|
| Example 1 | THV500 | solventless PSA syrup | EB | stable breakage of 1181 g/inch | No breakage between THV500 and PSA. |
| Comparative Example 1 | | | UV | slip-stick breakage of 150–800 g/inch | Broken between THV500 and PSA. |
| Example 2 | THV200 | solventless PSA syrup | EB | stable breakage of 1792 g/inch | No breakage between THV500 and PSA. |
| Comparative Example 2 | | | UV | slip-stick breakage of 250–1100 g/inch | Broken between THV200 and PSA. |
| Example 3 | PFA | solventless PSA syrup | EB | stable breakage of 1631 g/inch | Broken between aluminum and PSA and sometimes between PFA and PSA. |
| Comparative Example 3 | | | UV | immeasurable | PSA adhered to silicone release liner side. |
| Example 4 | FEP | solventless PSA syrup | EB | stable breakage of 1534 g/inch | Broken between aluminum and PSA and sometimes between FEP and PSA. |
| Comparative Example 4 | | | UV | immeasurable | PSA adhered to silicone release liner side. |
| Example 5 | PVDF | solventless PSA syrup | EB | stable breakage of 1856 g/inch | No breakage between PVDF and PSA. |
| Comparative Example 5 | | | UV | stable breakage of 1405 g/inch | Broken between PVDF and PSA. |
| Example 6 | VDF-HFP | solventless PSA syrup | EB | stable breakage of 2192 g/inch | No breakage between FDF-HFP and PSA. |
| Comparative Example 6 | | | UV | stable breakage of 1301 g/inch | Broken between FDF-HFP and PSA. |
| Example 7 | ECTFE | solventless PSA syrup | EB | stable breakage of 1711 g/inch | No breakage between ECTFE and PSA. |
| Comparative Example 7 | | | UV | slip-stick breakage of 100–600 g/inch | Broken between ECTFE and PSA. |
| Example 8 | ETFE | solventless PSA syrup | EB | stable breakage of 1412 g/inch | No breakage between ETFE and PSA. |
| Comparative Example 8 | | | UV | slip-stick breakage of 70–350 g/inch | Broken between ETFE and PSA. |
| Example 9 | modified-PTFE | solventless PSA syrup | EB | stable breakage of 1509 g/inch | Broken between aluminum and PSA and sometimes between modified-PTFE and PSA. |

TABLE 4-continued

| Example | Substrate | PSA | Curing Method | T-Peel Strength and Breakage Mode | Breakage Site etc. |
|---|---|---|---|---|---|
| Comparative Example 9 | | | UV | immeasurable | PSA adhered to silicone release liner side. |
| Example 10 | FLUOREL | solventless PSA syrup | EB | stable breakage of 1633 g/inch | No breakage between FLUOREL and PSA. |
| Comparative Example 10 | | | UV | stable breakage of 799 g/inch | Broken between FLUOREL and PSA. |
| Example 11 | THV500 | RM-2738 | EB | stable breakage of 1853 g/inch | Broken between THV500 and PSA and sometimes between aluminum and PSA. |
| Comparative Example 11 | | | drying | slip-stick breakage of 100–400 g/inch | Broken between THV500 and PSA. |
| Example 12 | THV500 | IOA-FC-2211 | EB | stable breakage of 510 g/inch | No breakage between THV500 and PSA. |
| Comparative Example 12 | | | UV | stable breakage of 51 g/inch | PSA was not sufficiently polymerized. |
| Example 13 | THV500 | IOA-FX-13 | EB | stable breakage of 103 g/inch | No breakage between THV500 and PSA. |
| Comparative Example 13 | | | UV | | PSA was not sufficiently polymerized. |
| Example 14 | THV500 | BA-FC-2211 | EB | stable breakage of 952 g/inch | No breakage between THV500 and PSA. |
| Comparative Example 14 | | | UV | stable breakage of 509 g/inch | PSA was not sufficiently polymerized. |
| Example 15 | THV500 | poly(α-olefin) | EB | stable breakage of 756 g/inch | No breakage between THV500 and PSA. |
| Comparative Example 15 | | | UV | stable breakage of 212 g/inch | Broken between THV500 and PSA. |
| Example 16 | THV200 | poly(α-olefin) | EB | stable breakage of 851 g/inch | No breakage between THV200 and PSA. |
| Comparative Example 16 | | | drying | stable breakage of 82 g/inch | Broken between THV200 and PSA. |
| Example 17 | FLUOREL | poly(α-olefin) | EB | stable breakage of 633 g/inch | No breakage between FLUOREL and PSA. |
| Comparative Example 17 | | | drying | stable breakage of 409 g/inch | Broken between aluminum and PSA and sometimes between FLUOREL and PSA |
| Comparative Example 18 | PTFE | poly(α-olefin) | EB | stable breakage of 303 g/inch | Broken between PTFE and PSA and tensile strength of PTFE was deteriorated. |
| | | | drying | immeasurable | PSA adhered to silicone release liner side. |
| Example 19 | THV500 | SIS | EB | stable breakage of 1165 g/inch | No breakage between THV500 and PSA. |
| Comparative Example 19 | | | drying | stable breakage of 1082 g/inch | No breakage between THV500 and PSA but on rapid peeling, readily decayed between THV500 and PSA. |
| Example 20 | THV500 | L-silicone | EB | stable breakage of 953 g/inch | No breakage between THV500 and PSA. |
| Comparative Example 20 | | | drying | stable breakage of 181 g/inch | Cohesion of PSA was very low. |
| Example 21 | THV500 | X-silicone | EB | stable breakage of 450 g/inch | No breakage between THV500 and PSA. |
| Comparative Example 21 | | | drying | stable breakage of 1050 g/inch | No breakage between THV500 and PSA. |
| Example 22 | blend (PVDF/PMMA-80/20) | solventless PSV syrup | EB | stable breakage of 1902 g/inch | No breakage between film and PSA. |
| Comparative Example 22 | | | UV | stable breakage of 1423 g/inch | Broken between film 500 and PSA. |

(B) Adhesion Between Fluorine-Containing Material Sheet and Intermediate Layer

In the following Examples, a material (intermediate layer) other than a pressure sensitive adhesive, having a low adhesion property to a fluorine-containing film (THV film or PVDF film was used) was adhered by the irradiation of an electron beam. For example, in the case of an elastic material such as urethane or acryl elastomer, in the case where the material becomes a primer layer or anchor layer after polymerization, as of a blend of isobornyl acrylate or butyl acrylate and an acrylic acid, and in the case of paint or ink. In some cases, coloring may be applied thereon (elastic material, primer layer or paint). These possibilities were examined here. Incidentally, in the case where such an intermediate layer is formed, it is easy to finally coat a pressure sensitive adhesive as an outermost layer.

Adherend (Fluorine-Containing Material Sheet)

THV500 film (manufactured from T-die extruder, thickness: about 200 μm) or PVDF film (commercially available film, thickness: about 260 μm)

Material (Intermediate Layer) Formed on Fluorine-Containing Material Sheet, Other Than Pressure Sensitive Adhesive (a) Elastic Material Urethane acrylate (M-1310, produced by Toa-Gosei Kagaku K. K., cross-linked type because this is bifunctional) as a urethane-based material and 2-methoxyethyl acrylate (produced by Wako Junyaku Kogyo K.K) as an acrylic rubber-type material were used. Since the 2-methoxyethyl acrylate is monofunctional, addition of a cross-linking agent thereto was also tried.

The urethane acrylate as having a high viscosity at an ambient temperature was hot-melt coated on a fluorine film at about 80° C. to have a thickness of about 200 μm. A solvent diluent or a surface active agent may also be added. The methoxyethyl acrylate, which has a low viscosity at an ambient temperature, was processed by adding 0.01% (for electron beam curing of Examples) or 0.5% (for ultraviolet ray curing of comparative Examples) of a photoinitiator (Darocur 1173, produced by Ciba Specialty Chemicals K.K.) while irradiating an ultraviolet ray to increase the viscosity up to the level of capable of good coating. If desired, a surface active agent may be added. Thereafter, in some Examples, a crosslinking agent (KAYARAD HDDA, produced by Nippon Kayaku K.K.) was added. The coating thickness was controlled to be about 200 μm. After the coating, the surface was protected by a transparent silicone release liner and then electron beam (Examples) or ultraviolet ray (Comparative Examples) radiation was used to cure the intermediate layer material. The compositions are shown in Table 5.

(b) Primer Layer

Three kinds of materials were used, namely, isobornyl acrylate (IBA, IB-XA, produced by Kyoei-Sha Yushi Kagaku Kogyo K.K.), t-butyl acrylate (TBA, produced by Osaka Yuki Kagaku Kogyo K.K.) and a blend of butyl acrylate (BA, produced by Wako Junyaku Kogyo K.K.) and acrylic acid (AA, produced by Wako Junyaku Kogyo K.K.) (blending ratio: BA/AA=30). In any case, similarly to the above (a), a slight amount (0.01% or 0.5%) of a photoinitiator was added, the viscosity was increased by irradiating with an ultraviolet ray and then each material was coated. The coating thickness was controlled to be about 30 μm. After the coating, the surface was protected by a transparent silicone release liner and then an electron beam irradiation (Examples) or an ultraviolet ray irradiation (Comparative Examples) was used. The compositions are shown in Table 5.

(c) Paint or Ink

Using an ultraviolet ray curable ink (UV FIL ink No. 190, produced by Teikoku Ink Seizo K.K.), a line in a width of about 300 μm was drawn and cured by an electron beam (Examples) or an ultraviolet ray (Comparative Examples). Conditions for Electron Beam Irradiation and Ultraviolet Ray Irradiation The electron beam irradiation was performed under the conditions such that the acceleration voltage was 250 kV and the linear density was 20 Mrad. The ultraviolet irradiation was performed at an exposure of 1,500 mJ/cm².

TABLE 5

Combination of Composition and Fluorine Film

| | Composition | Fluorine film |
|---|---|---|
| Example 23 | M-1310 | THV |
| Comparative Example 23 | M-1310 + 0.5% of photoinitiator | THV |
| Example 24 | M-1310 | PVDF |
| Comparative Example 24 | M-1310 + 0.5% of photoinitiator | PVDF |
| Example 25 | MEA + 0.01% of photoinitiator | THV |
| Comparative Example 25 | MEA + 0.5% of photoinitiator | THV |
| Example 26 | MEA + 0.01% of photoinitiator | PVDF |
| Comparative Example 26 | MEA + 0.5% of photoinitiator | PVDF |
| Example 27 | MEA + 0.01% of photoinitiator + 0.5% of cross-linking agent | THV |
| Comparative Example 27 | MEA + 0.01% of photoinitiator + 0.5% of cross-linking agent | THV |
| Example 28 | MEA + 0.01% of photoinitiator + 0.5% of cross-linking agent | PVDF |
| Comparative Example 28 | MEA + 0.01% of photoinitiator + 0.5% of cross-linking agent | PVDF |
| Example 29 | MEA + 0.01% of photoinitiator + 1% of cross-linking agent | THV |
| Comparative Example 29 | MEA + 0.01% of photoinitiator + 1% of cross-linking agent | THV |
| Example 30 | MEA + 0.01% of photoinitiator + 1% of cross-linking agent | PVDF |
| Comparative Example 30 | MEA + 0.01% of photoinitiator + 1% of cross-linking agent | PVDF |
| Example 31 | IBA + 0.01% of photoinitiator | THV |
| Comparative Example 31 | IBA + 0.5% of photoinitiator | THV |
| Example 32 | IBA + 0.01% of photoinitiator | PVDF |
| Comparative Example 32 | IBA + 0.5% of photoinitiator | PVDF |
| Example 33 | TBA + 0.01% of photoinitiator | THV |
| Comparative Example 33 | TBA + 0.5% of photoinitiator | THV |
| Example 34 | TBA + 0.01% of photoinitiator | PVDF |
| Comparative Example 34 | TBA + 0.5% of photoinitiator | PVDF |
| Example 35 | BA/AA = 30/70 + 0.01% of photoinitiator | THV |
| Comparative Example 35 | BA/AA = 30/70 + 0.01% of photoinitiator | THV |
| Example 36 | BA/AA = 30/70 + 0.01% of photoinitiator | PVDF |
| Comparative Example 36 | BA/AA = 30/70 + 0.01% of photoinitiator | PVDF |
| Example 37 | UV FIL 190 | THV |
| Comparative Example 37 | UV FIL 190 | THV |
| Example 38 | UV FIL 190 | PVDF |
| Comparative Example 38 | UV FIL 190 | PVDF |

Results

After the curing by electron beam or ultraviolet ray, the protective liner was removed (except for Examples 37 and 38 and Comparative Examples 37 and 38). Thereafter, all samples were immersed in methyl ethyl ketone at room temperature for 24 hours and the adhesive property between layers and the solvent resistance were examined. In the samples of Examples 23 to 38, peeling did not occur between the fluorine film and the elastic layer, the primer layer or the paint layer and the intermediate layer was free of dissolving in the solvent to disappear, thus no particular change was observed. On the other hand, in comparative samples, peeling between layers or dissolution in the solvent occurred. The results obtained are shown in Table 6 below.

TABLE 6

Change after Immersion in Solvent

| | |
|---|---|
| Example 23 | No particular change |
| Comparative Example 23 | Urethane layer was peeled off and suspended in the solvent. |
| Example 24 | No particular change |
| Comparative Example 24 | Urethane layer was peeled off and suspended in the solvent. |
| Example 25 | No particular change |
| Comparative Example 25 | Acrylic rubber layer was dissolved in the solvent. |
| Example 26 | No particular change |
| Comparative Example 26 | Acrylic rubber layer was dissolved in the solvent. |
| Example 27 | No particular change |
| Comparative Example 27 | Acrylic rubber layer was peeled off and suspended in the solvent. |

TABLE 6-continued

Change after Immersion in Solvent

| | |
|---|---|
| Example 28 | No particular change |
| Comparative Example 28 | Acrylic rubber layer was peeled off and suspended in the solvent. |
| Example 29 | No particular change |
| Comparative Example 29 | Acrylic rubber layer was peeled off and suspended in the solvent. |
| Example 30 | No particular change |
| Comparative Example 30 | Acrylic rubber layer was peeled off and suspended in the solvent. |
| Example 31 | No particular change |
| Comparative Example 31 | Acrylic rubber layer was dissolved in the solvent. |
| Example 32 | No particular change |
| Comparative Example 32 | Acrylic rubber layer was dissolved in the solvent. |
| Example 33 | No particular change |
| Comparative Example 33 | Acrylic rubber layer was dissolved in the solvent. |
| Example 34 | No particular change |
| Comparative Example 34 | Acrylic rubber layer was dissolved in the solvent. |
| Example 35 | No particular change |
| Comparative Example 35 | Acrylic rubber layer was dissolved in the solvent. |
| Example 36 | No particular change |
| Comparative Example 36 | Acrylic rubber layer was dissolved in the solvent. |
| Example 37 | No particular change |
| Comparative Example 37 | Paint was dissolved in the solvent. |
| Example 38 | No particular change |
| Comparative Example 38 | Paint was dissolved in the solvent. |

Formation of Multi-layer Structure

In representative Examples 23, 35 and 37 out of the Examples described above, a pressure sensitive adhesive was coated after irradiation by an electron beam to manufacture multi-layer structure films and these were designated as Examples 39, 40 and 41, respectively. The structure was a three-layer structure of fluorine film/electron beam curable material/pressure sensitive adhesive. The adhesion between the fluorine film and the electron beam curable material (intermediate layer) was remarkably improved by the present invention. After the intermediate layer was cured by the electron beam while its surface remained unprotected by a release liner, a solvent-based pressure sensitive adhesive (shown above) was coated and then the solvent was volatilized in an oven at 100° C. The pressure sensitive adhesive had a dry thickness of about 50 μm. The T-peel strength with the aluminum sheet was examined by the method described above, then it was verified that a multi-layer structure material having an excellent adhesive property between the pressure sensitive adhesive and the intermediate layer (elastic material, primer layer or paint) was obtained. Even when a solventless-type pressure sensitive adhesive syrup (shown above) was used as the pressure sensitive adhesive and cured by an ultraviolet ray, the multi-layer structure material obtained had an excellent adhesive property between the pressure sensitive adhesive and the intermediate layer (elastic material, primer layer or paint).

EFFECTS OF THE INVENTION

As described in the foregoing, according to the present invention, the adhesion between the fluorine-containing material substrate having a poor adhesive property and the pressure sensitive adhesive or the intermediate layer can be remarkably improved in a simple manner by irradiating an electron beam.

As one of the important effects of the present invention, surface treatment of a fluorine-containing material (sheet) having a low adhesive property, incorporation of a special pressure sensitive adhesive and interposing of an adhesive layer between those different materials can be dispensed with by merely coating an existing pressure sensitive adhesive on a material having a low adhesive property and irradiating an electron beam thereon, the pressure sensitive adhesive can be of course polymerized or cross-linked, strong adhesion can be attained (self priming) based on the chemical bond at the interface between the pressure sensitive adhesive and the sheet, the sheet side can also be cross-linked depending on the intensity of the electron beam, and moreover, the heat resistance or chemical resistance of the sheet can be simultaneously improved (all in one process).

An intermediate layer may be interposed between the fluorine-containing material substrate and the pressure sensitive adhesive so as to increase the adhesive property and also in this case, the intermediate layer is not required to have an adhesive property to the fluorine-containing material substrate but strong adhesion can be attained only by irradiating an electron beam thereon.

What is claimed is:

1. A pressure sensitive adhesive sheet comprising a substrate which is an electron-beam non-decaying fluorine-containing material sheet and a pressure sensitive adhesive layer provided on the outer surface of the substrate with or without an intermediate layer therebetween, wherein said fluorine-containing material sheet has a chemical bond with the pressure sensitive adhesive layer or intermediate layer directly contacting with said fluorine-containing material sheet and the chemical bond is formed by the irradiation of an electron beam at least on said fluorine-containing material sheet.

2. The pressure sensitive adhesive sheet as claimed in claim 1, wherein said fluorine-containing material sheet contains a polymer cross-linked by the irradiation of an electron beam.

3. The pressure sensitive adhesive sheet as claimed in claim 1, wherein said pressure sensitive adhesive layer contains a pressure sensitive adhesive crosslinked by the irradiation of an electron beam.

4. The pressure sensitive adhesive sheet as claimed in claim 2, wherein said pressure sensitive adhesive layer contains a pressure sensitive adhesive crosslinked by the irradiation of an electron beam.

5. The pressure sensitive adhesive sheet as claimed in claim 1, wherein said fluorine-containing material sheet contains 10 wt % or more of fluorine.

6. The pressure sensitive adhesive sheet as claimed in claim 2, wherein said fluorine-containing material sheet contains 10 wt % or more of fluorine.

7. The pressure sensitive adhesive sheet as claimed in claim 3, wherein said fluorine-containing material sheet contains 10 wt % or more of fluorine.

8. The pressure sensitive adhesive sheet as claimed in claim 1, wherein said pressure sensitive adhesive sheet is transparent.

9. The pressure sensitive adhesive sheet as claimed in claim 2, wherein said pressure sensitive adhesive sheet is transparent.

10. The pressure sensitive adhesive sheet as claimed in claim 3, wherein said pressure sensitive adhesive sheet is transparent.

11. The pressure sensitive adhesive sheet as claimed in claim 4, wherein said pressure sensitive adhesive sheet is transparent.

12. The pressure sensitive adhesive sheet as claimed in claim 1, wherein said pressure sensitive adhesive sheet is a protective film.

13. The pressure sensitive adhesive sheet as claimed in claim 2, wherein said pressure sensitive adhesive sheet is a protective film.

14. The pressure sensitive adhesive sheet as claimed in claim 3, wherein said pressure sensitive adhesive sheet is a protective film.

15. The pressure sensitive adhesive sheet as claimed in claim 4, wherein said pressure sensitive adhesive sheet is a protective film.

16. The pressure sensitive adhesive sheet as claimed in claim 5, wherein said pressure sensitive adhesive sheet is a protective film.

17. A method for producing a pressure sensitive adhesive sheet comprising a substrate which is an electron-beam non-decaying fluorine-containing material sheet and a pressure sensitive adhesive layer provided on the outer surface of the substrate with or without an intermediate layer thereon, said method comprising coating a pressure sensitive adhesive layer or an intermediate layer on the surface of an electron-beam non-decaying fluorine-containing material sheet and irradiating an electron beam on said coated fluorine-containing material sheet to form a chemical bond between said pressure sensitive adhesive layer or intermediate layer and said fluorine-containing material sheet.

18. A method for producing a pressure sensitive adhesive sheet comprising a substrate which is an electron-beam non-decaying fluorine-containing material sheet and a pressure sensitive adhesive layer provided on the outer surface of the substrate with or without an intermediate layer, said method comprising irradiating an electron beam on a electron-beam non-decaying fluorine-containing material sheet and then coating a pressure sensitive adhesive layer or an intermediate layer on the surface of said fluorine-containing material sheet to form a chemical bond between said fluorine-containing material sheet and said pressure sensitive adhesive layer or intermediate layer.

* * * * *

UNITED STATES PATENT AND TRADEMARK OFFICE
CERTIFICATE OF CORRECTION

PATENT NO. : 6,878,440 B1
DATED : April 12, 2005
INVENTOR(S) : Yamanaka Keizo

It is certified that error appears in the above-identified patent and that said Letters Patent is hereby corrected as shown below:

Title page,
Item [57], ABSTRACT,
Line 3, insert the word -- the -- after "between" and before "substrate"

Column 3,
Line 23, "y-ray" should be shown as -- γ-ray --

Column 8,
Lines 7-10, "Also, am electron-beam degradable material may be used in combination with a non electron-beam degradable or electron cross-linkable material if a film of the combination is not damaged by electron beam irradiation." should be shown as -- Also a film of an electron-beam degradable material can be made so as not to be damaged by electron-beam irradiation, for example, by combining the material with a non electron-beam degradable or electron cross-linkable material, and, therefore such materials can be used under such irradiation conditions. --

Column 11,
Line 6, "ement" should be shown as -- treatment --

Column 14,
Line 59, "CITE" should be shown as -- CTFE --
Line 60, "PTFE" should be shown as -- ETFE --

Column 17,
Line 2 "IOA/FC-22 11=80120" should be shown as -- IOA/FC-2211=80/20 --
Lines 9-10, "IOA/FC-221" should be shown as -- IOA/FC-2211 --
Line 11, "80/2010.4" should be shown as -- 80/20/0.4 --
Line 15, "ml/cm$^2$" should be shown as -- mJ/cm$^2$ --

Column 18,
Line 36, "nm/min" should be shown as -- mm/min --

UNITED STATES PATENT AND TRADEMARK OFFICE
CERTIFICATE OF CORRECTION

PATENT NO. : 6,878,440 B1
DATED : April 12, 2005
INVENTOR(S) : Yamanaka Keizo

It is certified that error appears in the above-identified patent and that said Letters Patent is hereby corrected as shown below:

Column 23,
Line 26, "BA/AA=30)" should be shown as -- BA/AA=30/70) --

Signed and Sealed this

Twenty-eighth Day of June, 2005

JON W. DUDAS
*Director of the United States Patent and Trademark Office*